United States Patent

Okuyama et al.

Patent Number: 5,675,587
Date of Patent: Oct. 7, 1997

[54] PRESET VIRTUAL PATH DETERMINING METHOD AND DEVICE IN ATM EXCHANGE SYSTEM

[75] Inventors: Yuzo Okuyama; Satoshi Kakuma; Shiro Uriu; Kazuo Hajikano, all of Kawasaki, Japan

[73] Assignee: Fujitsu Limited, Kanagawa, Japan

[21] Appl. No.: 758,061

[22] Filed: Nov. 27, 1996

Related U.S. Application Data

[63] Continuation of Ser. No. 275,595, Jul. 15, 1994, abandoned.

[30] Foreign Application Priority Data

Dec. 6, 1993 [JP] Japan ................... 5-305560

[51] Int. Cl.[6] ........................... G06F 11/00
[52] U.S. Cl. ........................ 371/20.1; 370/397
[58] Field of Search ................... 371/20.1, 20.4, 371/27, 48, 8.2, 11.2, 20.5, 25.1; 370/389, 392, 394, 395, 396, 397, 398, 399, 905

[56] References Cited

U.S. PATENT DOCUMENTS

| | | | |
|---|---|---|---|
| 5,157,654 | 10/1992 | Cisneros | 370/60 |
| 5,257,311 | 10/1993 | Naito et al. | 380/48 |
| 5,274,641 | 12/1993 | Shobatake et al. | 370/94.1 |
| 5,280,476 | 1/1994 | Kojima et al. | 370/60.1 |
| 5,309,444 | 5/1994 | Dartois et al. | 371/10.2 |
| 5,313,453 | 5/1994 | Uchida et al. | 370/13 |
| 5,313,454 | 5/1994 | Bustini et al. | 370/13 |
| 5,570,357 | 10/1996 | van Tetering et al. | 371/20.1 |

*Primary Examiner*—Robert W. Beausoliel, Jr.
*Assistant Examiner*—Albert Decady
*Attorney, Agent, or Firm*—Helfgott & Karas PC

[57] ABSTRACT

A test cell generating section periodically generates a pass determining test cell at preset timing, multiplexes them with user cells from a user line interface, and transmits the result of multiplexing to an ATM exchange. When no user cell is supplied from the user line interface, the test cell generating section transmits only the pass determining test cell to the ATM exchange. A cell determining section determines whether a cell supplied from the ATM exchange is a user cell or test cell, identifies/determines the pass based on information of the test cell and outputs only the user cell to the user line side when the supplied cell is the test cell.

32 Claims, 5 Drawing Sheets

INTRA-EXCHANGE ATM CELL FORMAT

PATH DETERMINING TEST CELL FORMAT

PRESET VIRTUAL PATH DETERMINING METHOD AND DEVICE IN ATM EXCHANGE SYSTEM

This is a continuation of application Ser. No. 08/275,595, filed Jul. 15, 1994, now abandoned.

BACKGROUND OF THE INVENTION

1. Field of the Invention

This invention relates to a PVC (Permanent Virtual Channel) service using a preset virtual path in an ATM (Asynchronous Transfer Mode) exchange system constructed by use of ATM exchanges, and more particularly to a preset virtual path determining method and device for determining a preset virtual path which is actually set.

2. Description of the Related Art

Recently, a system for a B-ISDN (Broadband-Integrated Service Digital Network) which is a broad-band ISDN capable of effecting high speed transmission has been developed for practical applications. As services by a network system constructed by use of ATM exchanges in the B-ISDN, a PVC service called a preset virtual path for previously setting passes used between subscribers at the time of starting of the system and permitting the communication service therebetween and an SVC (Signaling Virtual Channel) service for creating a communication path on the call-by-call basis in response to a communication request from the subscriber are prepared. In the future, the service of a type for creating the communication path on the call-by-call basis seems to be mainly used, but it is considered that the PVC service by the preset virtual path seems to be mainly used for the time being before such a type of service is established.

In a case where the PVC service is effected by use of the preset virtual path in the network system by the ATM exchange, that is, ATM exchange system, setting of the preset virtual path used between the subscribers is effected only at the time of starting of the ATM exchange system or at the time of registration of a subscriber, and after this, the path is fixedly maintained. Therefore, in the system for effecting the service by use of the preset virtual path, the path will not be set again after the preset virtual path is once set.

In the service using the preset virtual path in the ATM exchange system, a system for determining at a desired time whether or not a preset virtual path set at the time of starting of the ATM exchange system or at the time of registration of a subscriber as described above, is actually effective, is not provided. Therefore, after the system is once started or the subscriber is once registered, it is impossible to easily determine the preset virtual path which is actually set and used as an effective path.

Further, since the preset virtual path is set to be used between the subscribers in the ATM exchange, it is impossible to stably determine the setting state of the preset virtual path by a test effected by generating a testing cell from a testing device for determining a cell in the ATM exchange, for example.

The setting state of the preset virtual path in the above system cannot be determined unless a cell is actually transmitted between the subscribers. That is, the subscriber cannot determine that the preset virtual path is set until a cell for communication is supplied, for example. Particularly, when the path is not set, it becomes possible to determine that the semi-fixed path is not set only after supplying a cell for communication, for example.

SUMMARY OF THE INVENTION

An object of this invention is to provide a preset virtual path determining method and device capable of stably and effectively determining the setting state of a preset virtual path used between subscribers in a system using the ATM exchange at desired time.

With a preset virtual path determining system of this invention, the setting state of the preset virtual path is recognized at desired time by periodically determining the setting state of the preset virtual path used between the subscribers.

The semi-fixed path determining system of this invention includes an ATM exchange, user line interface, test cell generating section and cell identifying section.

The user line interface is an interface for adequately connecting the ATM exchange to a user line connected to a user terminal device. The test cell generating section periodically generates a path determining test cell at preset timing, multiplexes the path determining test cell with a user cell from the user line interface and transmits the result of multiplexing to the ATM exchange. When no user cell is transmitted from the user line interface, the test cell generating section transmits only the path determining test cell to the ATM exchange. The cell identifying section determines whether the cell supplied from the ATM exchange is the user cell or test cell, identifies/determines the path based on the information of the test cell when the supplied cell is the test cell, and outputs only the user cell to the user line side. The ATM exchange is connected to another user line, for example.

The test cell generating section may set a test cell indication portion in a tag area of ATM cell format in the ATM exchange and create a test cell and the cell identifying section may determine whether or not the supplied ATM cell is a test cell, based on the content of the test cell indication portion.

The test cell generating section may create a test cell which contains information indicating the number of user cells between the test cells in a pay-load of ATM cell format of the ATM exchange and the cell identifying section may identify and process the information indicating the number of user cells between the test cells and contained in the test cell.

The test cell generating section may create a test cell containing information for confirming the order of test cells in a pay-load of ATM cell format of the ATM exchange and the cell identifying section may identify and process the test cell order confirming information contained in the test cell.

The test cell generating section may create a test cell containing information for confirming the quality of the test cell in a pay-load of ATM cell format of the ATM exchange and the cell identifying section may identify and process the information confirming the quality of the test cell and contained in the test cell.

The test cell generating section may create a test cell containing information for checking an error of pay-load data in a pay-load of ATM cell format of the ATM exchange and the cell identifying section may identify and process the information for checking the error of the pay-load data and contained in the test cell.

With the semi-fixed pass determining system of this invention, a path determining test cell is periodically generated at preset timing in the test cell generating section, multiplexed with a user cell from the user line interface and then transmitted to the ATM exchange, and the cell identifying section determines whether a cell supplied from the ATM exchange is the user cell or test cell, identifies/determines the path based on the information of the test cell when the supplied cell is the test cell, and outputs only the user cell to the user line side. Thus, the actually set preset virtual path can be determined.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

There will now be described embodiments of this invention with reference to the accompanying drawings.

First Embodiment

Figure 1:
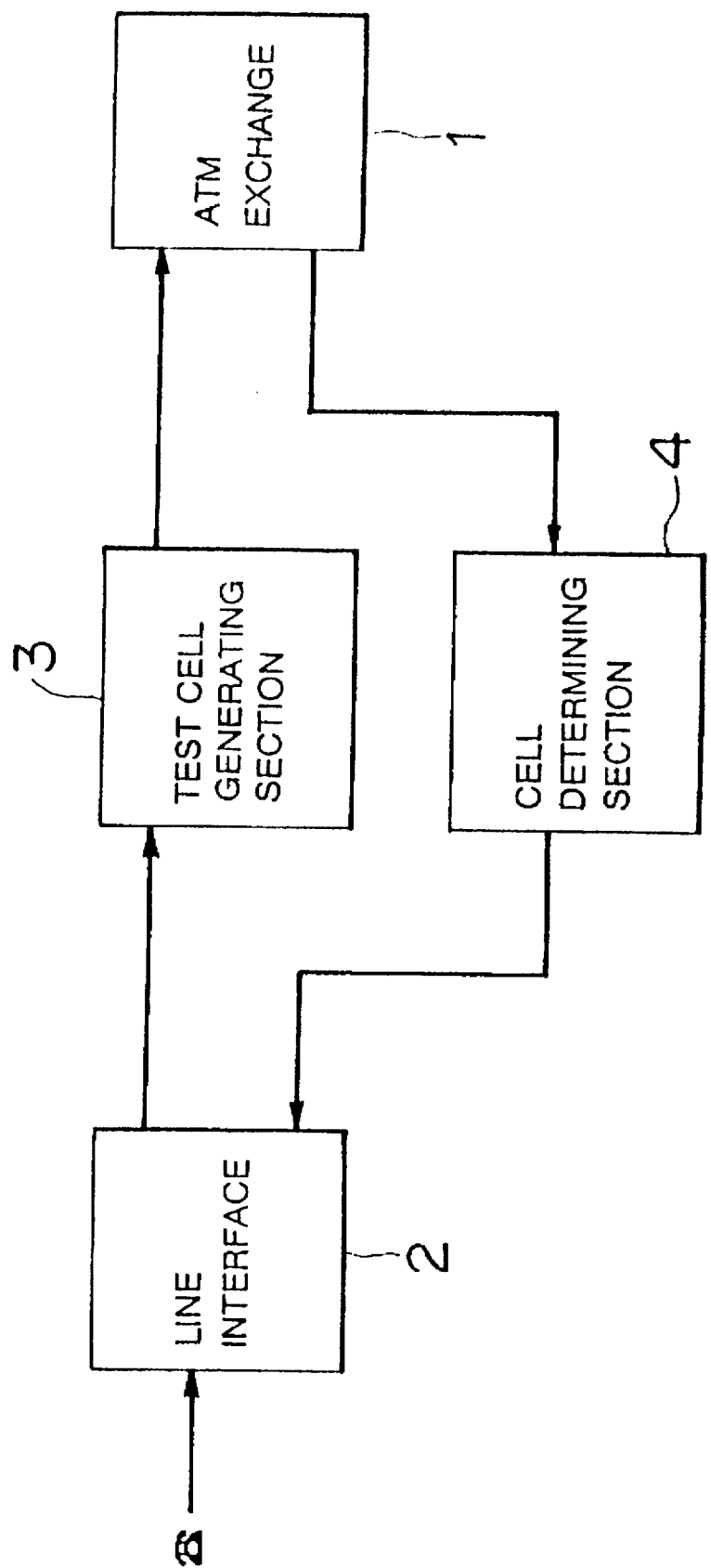
FIG. 1 is a block diagram showing the construction of a preset virtual path determining device according to a first embodiment of this invention.

The principle construction of a preset virtual path determining system according to a first embodiment of this invention is shown in FIG. 1.

The preset virtual path determining system shown in FIG. 1 includes an ATM exchange 1, user line interface 2, test cell generating section 3 and cell identifying section 4.

The user line interface 2 is an interface for adequately connecting the ATM exchange 1 to a user line which is connected to a user terminal device.

The test cell generating section 3 periodically generates a path determining test cell at preset timing, multiplexes the same with a user cell from the user line interface 2 and transmits the result of multiplexing to the ATM exchange 1. When no user cell is transmitted from the user line interface 2, the test cell generating section 3 transmits only the path determining test cell to the ATM exchange 1.

The cell identifying section 4 determines whether the cell supplied from the ATM exchange is the user cell or test cell, identifies/determines the path based on the information of the test cell when the supplied cell is the test cell and outputs only the user cell to the user line side.

The ATM exchange 1 is connected to another user line via an adequate interface although not shown in the drawing.

With the preset virtual path determining system of this invention, a path determining test cell is periodically generated at preset timing in the test cell generating section 3, multiplexed with a user cell from the user line interface 2 and then transmitted to the ATM exchange 1. The cell identifying section 4 determines whether a cell supplied from the ATM exchange is the user cell or test cell, identifies/determines the path based on the information of the test cell when the supplied cell is the test cell, and outputs only the user cell to the user line side. Thus, the actually set preset virtual path can be determined.

Second Embodiment

A semi-fixed path determining device according to a second embodiment of this invention is explained in detail.

Format of Test Cell

First, the format of a data cell used in the preset virtual path determining device of this invention is explained.

Figure 2:
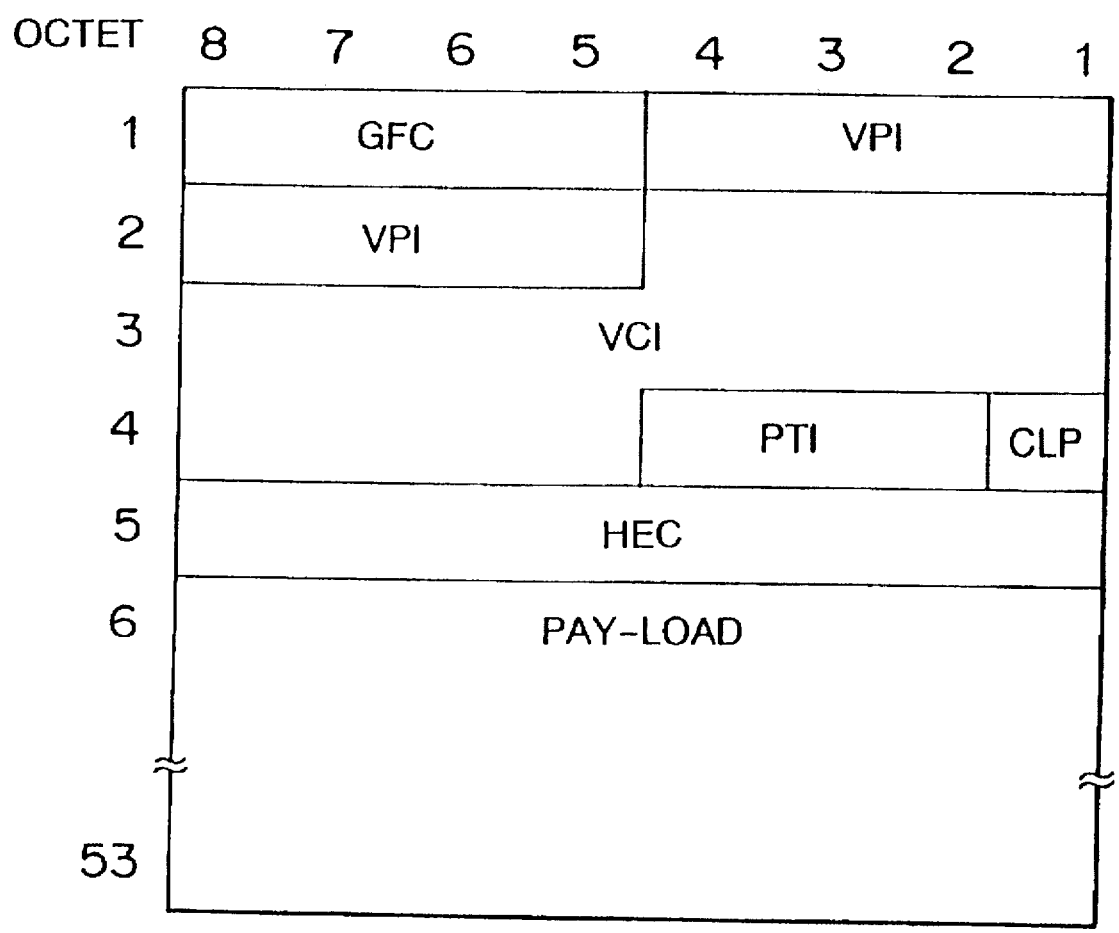
FIG. 2 is a diagram schematically showing the inter-user ATM format, for illustrating the operation of a preset virtual path determining device according to a second embodiment of this invention.

The interface is provided between the ATM terminal and ATM exchange by use of a data cell with data length of 53 octets as shown in the cell format of FIG. 2.

That is, the data cell is constructed by a 4-octet header, 1-octet header error control information HEC, and a 48-octet pay-load, the 4-octet header is constructed by 4-bit generative flow control information GFC, 8-bit imaginary bus identifying information VPI, 16-bit imaginary channel identifying information VCI, 3-bit pay-load type identifying information PTI, and 1-bit cell loss priority information CLP.

In the ATM exchange, the HEC check of the first 4-octet header is effected for the 53-octet data by use of the fifth octet HEC. After the HEC check, 1-octet HEC is eliminated in the ATM exchange and a 2-octet tag area TAG for control of a path in the ATM exchange is attached to the head to create a format shown in FIG. 3. The cell in the cell format shown in FIG. 3 flows in the ATM exchange. Then, if a preset one bit of the tag area TAG is used to indicate that the cell is a user cell or preset virtual path determining cell, the normality of the preset virtual path can be easily determined between user terminals.

Figure 3:
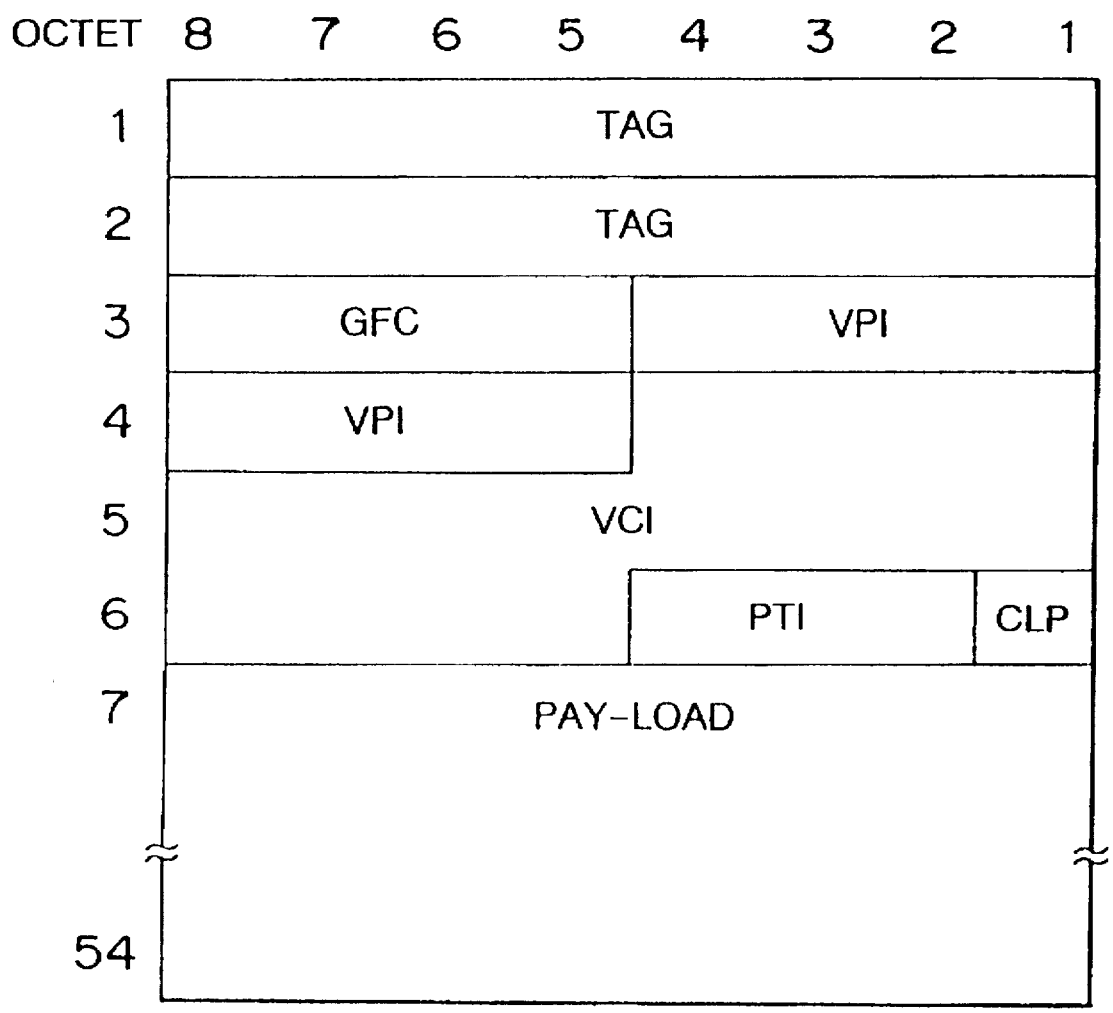
FIG. 3 is a diagram schematically showing the ATM format in the exchange, for illustrating the operation of the preset virtual path determining device according to the second embodiment of this invention.

The concrete content of the tag area TAG becomes variously different according to the specification of the ATM exchange. Therefore, determination whether the data cell is a user cell or preset virtual path determining test cell is made according to ON/OFF of a preset one bit which is previously set in the tag area TAG. A portion of the third to sixth octets in the cell format of the ATM exchange shown in FIG. 3 is set such that the pass determining test cell may be set to the same value as the user cell so as to be recognized between the terminals of the ATM exchanges. The preset virtual path determining test cell is inserted to flow while no user cell is flowing, that is, in a specified cycle (for example, for every 256 cells) in a period of vacant cell.

Figure 4:
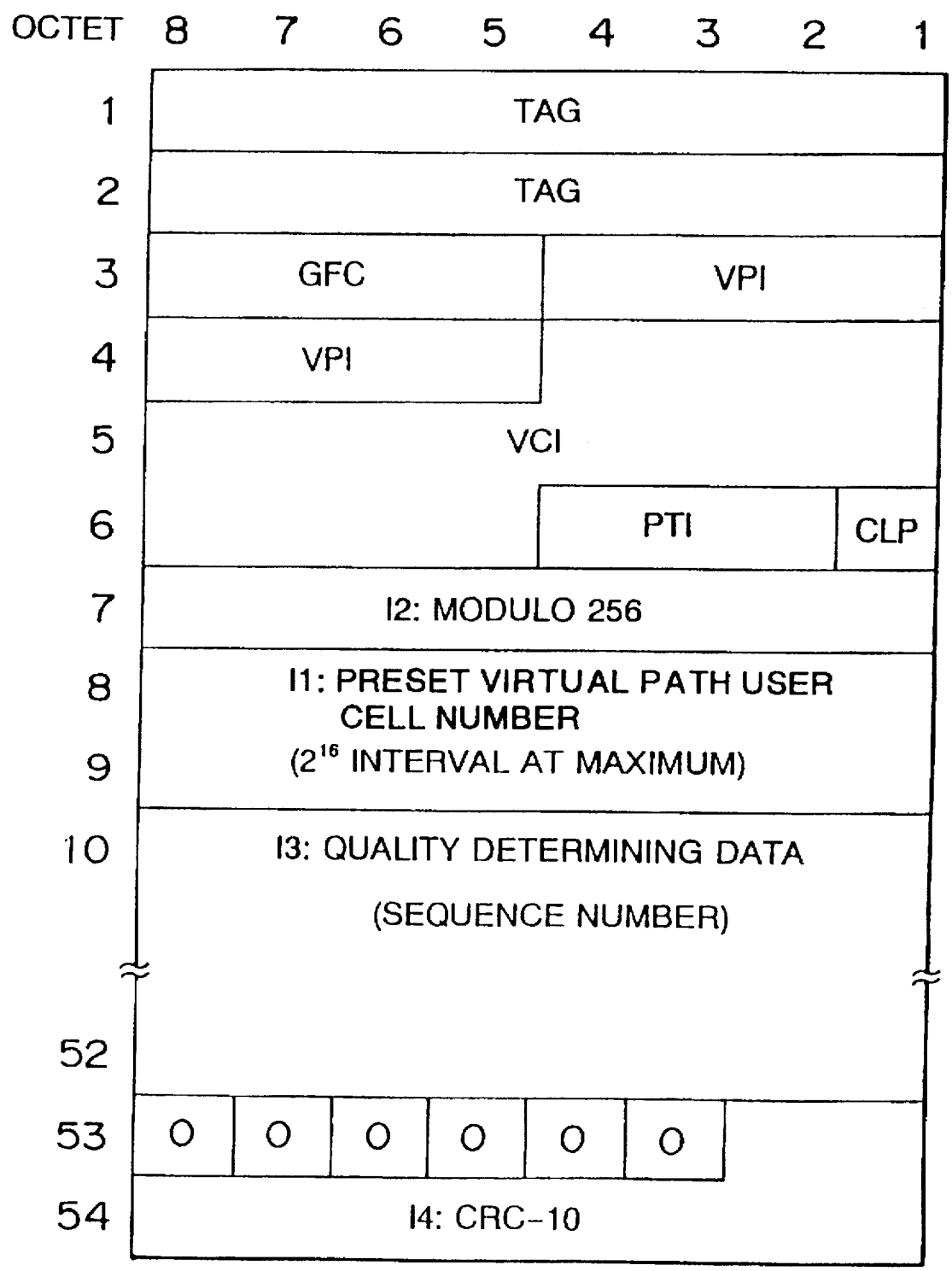
FIG. 4 is a diagram schematically showing the cell format of a preset virtual path determining test cell, for illustrating the operation of the preset virtual path determining device according to the second embodiment of this invention.

The concrete format of the preset virtual path determining test cell is shown in FIG. 4. As shown in FIG. 4, the following information is inserted into the cell pay-load portion of the preset virtual path determining test cell.

(1) The number I1 of user cells between the preset virtual path determining test cells.

(2) A modulo 256 pattern I2 as an order confirming number between the preset virtual path determining test cells.

(3) Cell quality determining data I3.

(4) CRC-10 information I4.

The modulo 256 pattern I2 is something like a sequence number and is used to determine whether any test cell is omitted or not. For example, if a first transmitted value is "00000000", a next value will be "00000001".

The number I1 of user cells between the test cells is information which indicates the number of inserted user cells when user cells are provided between the test cells. If no user cell to be transmitted is present, test cells are continuously transmitted. In this case, for example, data of $2^{16}$ cells at maximum can be inserted between the test cells as user cells. In practice, the interval for transmitting the test cell may be set by the definite time interval, for example, one second or two seconds instead of defining the same by the number of cells.

The cell quality determining data I3 is arranged in the tenth to fifty-second octets and the data is used for confirming the normality of the content data of the cell. As the cell quality determining data I3, for example, a sequence number or random pattern standardized by ITU-T (International Telecommunication Union-Telecommunication Standardization Sector), CCITT (Comité consulatif international télégraphique et téléphonique) is used.

The CRC-10 information I4 is a so-called check code and used to check an error of data in the pay-load.

As shown in FIG. 4, if the above information is inserted in the pay-load portion, determination for the following items can be made by using the above information, for example.

(1) Determination of an interval between the preset virtual path determining test cells.

(2) The number of discarded user cells.

(3) Determination of omission of the preset virtual path determining test cell.

(4) Determination of quality of the preset virtual path in the ATM exchange.

If the above test cell is supplied from one terminal side in which the preset virtual path is set to the other terminal at a regular interval irrespective of the presence or absence of the user cell, the setting state of the preset virtual path can be determined at desired time by identifying and determining data of the test cell on the other terminal side.

Second Embodiment

Next, a concrete semi-fixed path determining device according to a second embodiment of this invention using the test cell of the above-described format is explained with reference to the accompanying drawings.

Figure 5:
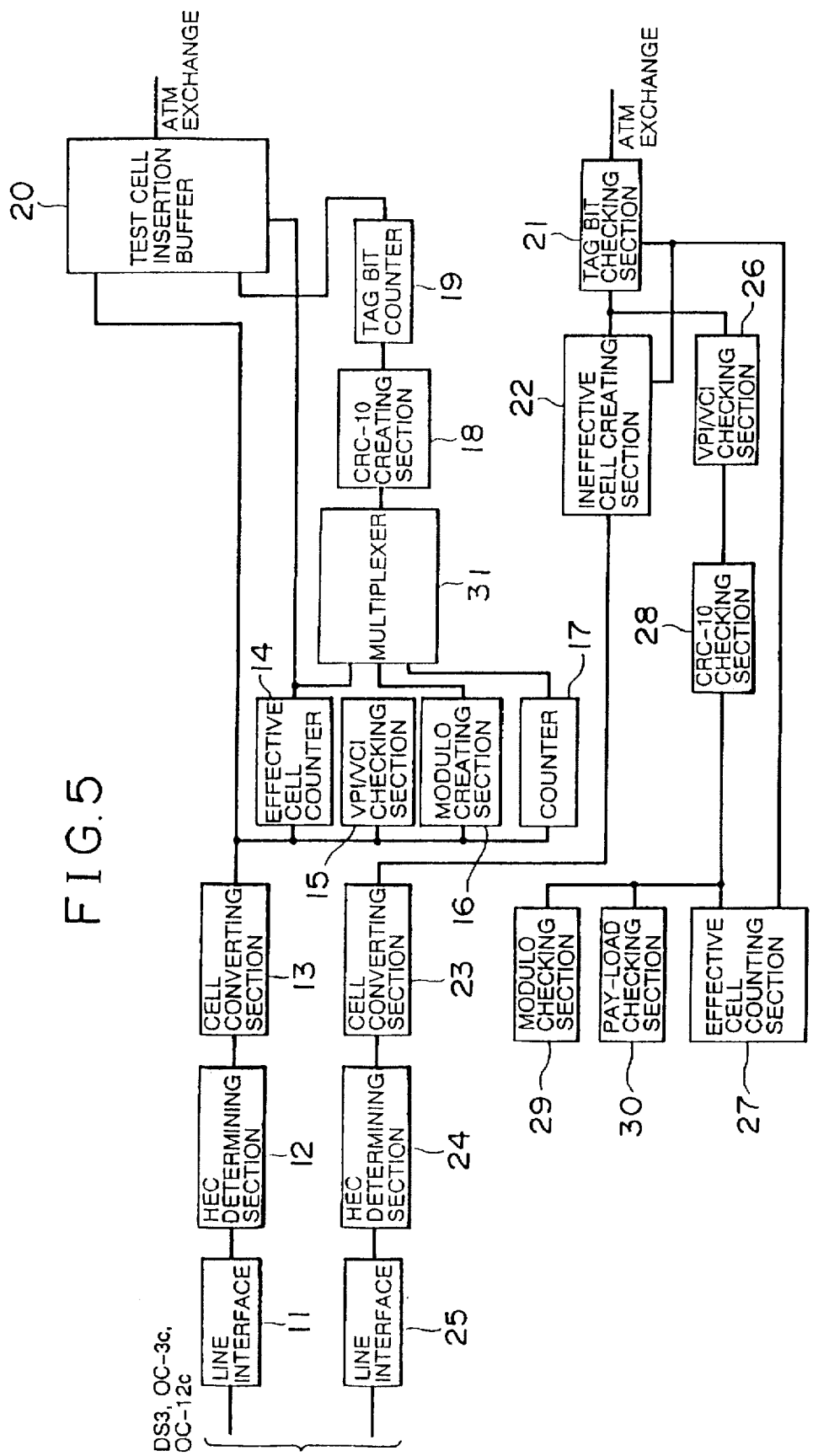
FIG. 5 is a block diagram showing the construction of the main portion of the semi-fixed path determining device according to the second embodiment of this invention.

FIG. 5 shows the construction of the main portion of the preset virtual path determining device.

The preset virtual path determining device of FIG. 5 includes a line interfaces 11, 25, HEC determining section 12, cell format converting sections 13, 23, effective cell counting sections 14, 27, VPI/VCI checking sections 15, 26, modulo creating section 16, counter 17, CRC-10 creating section 18, tag bit counter 19, test cell insertion buffer 20, tag bit checking section 21, ineffective cell creating section 22, HEC creating section 24, CRC-10 checking section 28, modulo checking section 29, pay-load data checking section 30 and multiplexer 31.

The user line connected to terminals is interfaced according to the interface specification such as DS-3 (45 Mbits/s), OC-3C (156 Mbits/s) or OC-12C (622 Mbits/s). The line interface 11 extracts and receives an ATM cell of cell format as shown in FIG. 2 from the pay-load of signals of the above interface specification. The ATM cell extracted by the line interface 11 is supplied to the HEC determining section 11 which in turn checks whether the received ATM cell is an effective cell or ineffective cell. The determination is made by use of HEC (Header Error Control) information of fifth octet shown in FIG. 2.

When no abnormal condition is detected in the determination by the HEC determining section 11, the inter-user ATM cell format of FIG. 2 is converted into the intra-exchange ATM cell format by the cell format converting section 13. The ATM cell converted in the cell format converting section 13 is supplied to the effective counting section 14, VPI/VCI checking section 15, modulo creating section 16 and counter 17.

The effective counting section 14 counts an effective cell output from the cell format converting section 13 to derive a preset virtual path user cell number I1 when values of the third to sixth octets shown in FIG. 3 are the same as those which are previously held in the VPI/VCI checking table in the VPI/VCI checking section 15.

The modulo creating section 16 creates the modulo 256 pattern I2 of the seventh octet shown in FIG. 4. The modulo creating section 16 functions to increment (count up) the value of a modulo to be created each time a test cell shown in FIG. 4 is transmitted. The counter 17 is an 8-bit counter (capable of setting a 256-bit sequence number) for setting a sequence number and sets a sequence number into the quality determining data I3 of the tenth to fifty-second octets of FIG. 4. For example, when a value of "00000000" is set into the tenth octet, a value of "00000001" is set in the eleventh octet, and thus the sequence number is incremented by one each time the octet number is increased. Since a 256-bit pattern is sequentially set into the tenth to fifty-second octets, the same value is not always set.

The multiplexer 31 multiplexes the semi-fixed pass user cell I1 obtained in the effective counting section 14, modulo 256 pattern I2 obtained in the modulo creating section 16 and quality determining data I3 constructed by a sequence number obtained in the counter 17 into the format shown in FIG. 4.

Information multiplexed in the multiplexer 31 is supplied to the CRC-10 creating section 18. In the CRC-10 creating section 18, CRC-10 information corresponding to data of the seventh to fifty-second octets of FIG. 4 is created and added to the multiplexed information. An output of the CRC-10 creating section 18 is supplied to the tag bit counter 19, and in the tag bit counter 19, the value of the third to sixth octets shown in FIG. 4 is set to the same VPI/VCI value as that of the user cell and a preset bit of the tag area TAG indicating a test cell is set into the ON state.

The test cell insertion buffer 20 is a buffer for multiplexing a test cell with a user cell output from the cell format converting section 13 and a method for inserting the test cell into the user cell is effected by inserting the test cell when the count of the effective cell counting section 14 has reached a preset cell number. An output of the test cell insertion buffer 20 is transmitted to the ATM exchange side.

A data cell supplied from the ATM exchange is supplied to the tag bit checking section 21 which in turn checks a preset bit of the tag area TAG and determines whether the cell is a user cell or test cell. When it is determined to be a test cell, the test cell portion is converted into an ineffective cell in the ineffective cell creating section 22 so as to prevent the test cell from being supplied to the user side.

An output of the ineffective cell creating section 22 is supplied to the cell format converting section 23 and the format of FIG. 3 is converted into the format of FIG. 2. An output of the cell format converting section 23 is supplied to the HEC creating section 24. The HEC creating section 24 derives a HEC value corresponding to VPI/VCI of the first to fourth octets shown in FIG. 2 according to an output of the cell format converting section 23 and inserts the thus derived value into the fifth octet area to make a format of FIG. 2. An output of the HEC creating section 24 is supplied to the line interface 25 and mapped into pay-load portions of signals of each interface specification.

A cell determined to be the test cell in the tag bit checking section 21 is supplied to the VPI/VCI checking section 26 and the VPI/VCI value thereof is determined. If the result of checking by the VPI/VCI checking section 26 indicates that it corresponds to a VPI/VCI value to be measured and determined, the CRC-10 information I4 of the fifty-third and fifty-fourth octets of FIG. 4 is checked in the CRC-10 checking section 28 and the normality of data of the seventh to fifty-second octets of FIG. 4 is checked.

If it is detected that the data is not normal as the result of checking by the CRC-10 checking section 28, data of the test cell is not normal and the checking process is stopped. On the other hand, if it is detected that the data is normal as the result of checking by the CRC-10 checking section 28, the number of user cells between the test cells is counted by the effective cell counting section 27 and compared with the user cell number I1 between the test cells of the eighth and ninth octets of FIG. 4 to check whether or not the cell number is correct.

The modulo checking section 29 checks whether or not the modulo 256 pattern I2 of the seventh octet of FIG. 4 is equal to a value obtained by adding one to the modulo value of the immediately preceding test cell so as to determine whether or not the test cell is normal. If the modulo value is not a proper value, the checking process is stopped like the case of CRC-10 checking process. If it is determined that the checking processes of the CRC-10 checking section 28 and the modulo checking section 29 are both normal, the pay-load data checking section 30 determines whether or not the quality determining data I3 of the tenth to fifty-second octets shown in FIG. 4 is correctly incremented by one. The value of the tenth octet among the quality determining data I3 is checked whether it is a value obtained by adding one to the value of the fifty-second octet in the cell quality determining data I3 of the immediately preceding test cell.

In a case where the pay-load data checking section 30 determines that all of the values are correctly set by effecting the above test cell checking process, it is determined that a corresponding preset virtual path is set. If the abnormality is detected in the above test cell checking process and the checking process is stopped, the preset virtual path is not correctly set, and therefore, display data or alarm signal may be supplied to a corresponding user line if necessary.

Various states can be determined by checking information inserted into the pay-load portion.

For example, it is possible to check the number of user cells between the preset virtual path determining cells and the number of discarded user cells between the preset virtual path determining-cells based on the result of comparison of the count value of the effective cells in the effective cell counting section 27 with the number I1 of the user cells between the test cells.

Further, it is possible to determine whether or not there is no omission in the preset virtual path determining test cells based on the checking result of the modulo 256 pattern I2 in the modulo checking section 29.

Also, it is possible to determine the quality of the preset virtual path in the ATM exchange based on the checking result of the cell quality determining data I3 in the pay-load data checking section 30.

As described above, in the preset virtual path determining device, the setting state of the preset virtual path used between the subscribers can be effectively and stably recognized at desired time by periodically generating a path determining test cell at preset timing in a system using the ATM exchange, multiplexing the cell with the user cell from the user interface and transmitting the result of multiplexing to the ATM exchange, and determining whether a cell supplied from the ATM exchange is a user cell or test cell and identifying/determining the path based on the test cell information and outputting only the user cell to the user line side if it is a test cell.

In the above second embodiment, the preset virtual path determining system of the construction shown in FIG. 5 using the test cell format as shown in FIG. 4 is used, but this invention is basically made to transmit test cell at preset timing as shown in FIG. 1, determine whether or not the received cell is a test cell and supply only the user cell to the user line. Therefore, the test cell format is only required to contain information indicating that the cell is a test cell or not in a previously specified location, and since the test cell is not used as a user cell, information used for various determination may be adequately set so as not to interfere the condition of the ATM cell. For example, information indicating the test cell may be set in an area other than the tag area and information for pass quality determination and information for cell quality determination of the test cell can be properly selected and set as required.

It is apparent that, in this invention, a wide range of different working modes can be formed based on the invention without deviating from the spirit and scope of the invention.

What is claimed is:

1. A preset virtual connection determining method for determining a preset virtual connection between subscribers when providing services by use of the preset virtual connection between subscribers through an exchange, the method comprising the steps of:

generating a test cell by a test cell generating section on an incoming line side of the exchange, time-divisionally multiplexing the test cell with a user cell by the test cell generating section, and transmitting a result of multiplexing from the test cell generating section to the exchange, the test cell containing information indicating the number of user cells sandwiched between test cells; and determining by a cell determining section whether a received cell is a user cell or a test cell at the time of reception of a cell from the exchange, and determining by the cell determining section the preset virtual connection and transmission quality concerning cell discard based on information of the test cell when the received cell is the test cell and outputting from the cell determining section the user cell to an outgoing line side when the received cell is the user cell.

2. The method according to claim 1, further comprising the step of setting a test cell indication data in a tag area of cell format in the exchange to determine whether or not the cell is a test cell.

3. The method according to claim 1, wherein the test cell contains test cell order determining information indicative of a sequential number of the test cell in a pay-load area of cell format in the exchange.

4. The method according to claim 1, wherein the test cell contains test cell quality determining data in a pay-load area of cell format in the exchange.

5. The method according to claim 4, wherein said test cell quality determining data is a random pattern standardized by ITU-T.

6. The method according to claim 1, wherein the test cell contains data for checking an error of payload data in a pay-load area of cell format in the exchange.

7. A preset virtual connection determining device for determining a preset virtual connection between subscribers when providing services by use of the preset virtual connection through an exchange, the device comprising:

test cell generating means for generating a test cell on an incoming line side, time-divisionally multiplexing the test cell with a user cell, and transmitting a result of multiplexing to said exchange, said test cell generating means including means for creating a test cell which contains information indicating the number of user cells sandwiched between test cells; and cell determining means for determining whether a cell supplied from said exchange is a user cell or a test cell, and determining the preset virtual connection, based on information of the test cell when the received cell is the test cell and outputting the user cell to an outgoing line side when the received cell is the user cell, said cell determining means including means for determining and processing the information of the test cell indicating the number of user cells sandwiched between the test cells.

8. The device according to claim 7, wherein said test cell generating means includes indication portion setting means for setting a test cell indication data in a tag area of cell format in said exchange and creating a test cell; and said cell determining means includes indication portion determining means for determining whether cell is a test cell based on the test cell indication data.

9. The device according to claim 7, wherein said test cell generating means includes means for creating a test cell which contains test cell order determining information indicative of a sequential number of the test cell in a pay-load area of cell format in said exchange; and said cell determining means includes means for determining and processing the test cell order determining information of the test cell.

10. The device according to claim 7, wherein said test cell generating means includes means for creating a test cell which contains test cell quality determining data in a pay-load area of cell format in said exchange; and said cell determining means includes means for determining and processing the test cell quality determining data of the test cell.

11. The device according to claim 10, wherein said test cell quality determining data is a random pattern standardized by ITU-T.

12. The device according to claim 7, wherein said test cell generating means includes means for creating a test cell which contains data for checking an error of pay-load data in a pay-load area of cell format in said exchange; and said cell determining means includes means for determining and processing the data of the test cell for checking an error of pay-load data.

13. A preset virtual connection determining device for determining a preset virtual connection between subscribers comprising:

a test cell generating section for generating a test cell at preset timing on a user line side of an exchange, time-divisionally multiplexing the test cell with a user cell and transmitting a result of multiplexing to said exchange, said test cell generating section including a device for creating a test cell which contains information indicating the number of user cells sandwiched between test cells in a pay-load area of cell format in said exchange; and a cell determining section for determining whether a cell supplied from said exchange is a user cell or test cell, and determining the preset virtual connection, based on information of the test cell when the received cell is the test cell and outputting the user cell to the user line side when the received cell is the user cell, said cell determining section including a device for determining and processing the information of the test cell indicating the number of user cells sandwiched between the test cells.

14. The device according to claim 13, wherein said test cell generating section includes an indication portion setting section for setting a test cell indication data in a tag area of cell format in said exchange and creating a test cell; and said cell determining section includes an indication portion determining section for determining whether or not a cell is a test cell based on the test cell indication data.

15. The device according to claim 13, wherein said test cell generating section includes a device for creating a test cell containing the information indicating the number of user cells sandwiched between test cells, test cell order determining information indicating a sequential number of the test cell, test cell quality determining data, and data for checking an error of pay-load data in a pay-load area of cell format in said exchange; and said cell determining section includes a device for determining and processing the information of the test cell indicating the number of user cells sandwiched between the test cells, the test cell order determining information, the test cell quality determining data, and the data for checking an error of pay-load data.

16. The device according to claim 15, wherein said test cell quality determining data is a random pattern standardized by ITU-T.

17. A preset virtual path determining method for determining an actually set preset virtual path when providing services by use of a preset virtual path between subscribers through an ATM exchange, the method comprising steps of:

periodically generating a path determining test cell at preset timing by a test cell generating section on a user line side of the ATM exchange, time-divisionally multiplexing the same with a user cell by the test cell generating section, and transmitting a result of multiplexing to the ATM exchange from the test cell generating section, the test cell containing information indicating the number of user cells sandwiched between test cells in a pay-load area of ATM cell format in the ATM exchange; and determining whether a received cell is a user cell or test cell at the time of reception of a cell from the ATM exchange by a cell determining section, and determining by the cell determining section the path and transmission quality concerning cell discard based on information of the test cell when the received cell is the test cell and outputting the user cell from the cell determining section to the user line side when the received cell is the user cell.

18. The method according to claim 17, further comprising the step of setting a test cell indication data in a tag area of ATM cell format in the ATM exchange to determine whether or not the ATM cell is a test cell.

19. The method according to claim 17, wherein the test cell contains test cell order determining information indicated sequential number of the test cell in a pay-load area of ATM cell format in the ATM exchange.

20. The method according to claim 17, wherein the test cell contains test cell quality determining data in a pay-load area of ATM cell format in the ATM exchange.

21. The device according to claim 20, wherein said test cell quality determining data is a random pattern standardized by ITU-T.

22. The method according to claim 17, wherein the test cell contains data for checking an error of pay-load data in a pay-load area of ATM cell format in the ATM exchange.

23. A preset virtual connection determining device for determining an actually set preset virtual path between subscribers when providing services by use of the preset virtual path through an ATM exchange, the device comprising:

test cell generating means for periodically generating a test cell at preset timing on a user line side of the ATM exchange, time-divisionally multiplexing the same with a user cell and transmitting a result of multiplexing to said ATM exchange, said test cell generating means including means for creating a test cell which contains information indicating the number of user cells sandwiched between test cells in a pay-load area of ATM cell format in said ATM exchange; and cell determining means for determining whether a cell supplied from said ATM exchange is a user cell or test cell, and determining the path on information of the test cell when the received cell is the test cell and outputting the user cell to the user line side when the received cell is the user cell, said cell determining means including means for determining and processing the information of the test cell indicating the number of user cells sandwiched between the test cells.

24. The device according to claim 23, wherein said test cell generating means includes indication portion setting means for setting a test cell indication data in a tag area of ATM cell format in said ATM exchange and creating a test cell; and said cell determining means includes indication portion determining means for determining whether an ATM cell is a test cell or not based on the test cell indication data.

25. The device according to claim 23, wherein said test cell generating means for creating a test cell which contains test cell order determining information indicated sequential number of the test cell in a pay-load area of ATM cell format in said ATM exchange; and said cell determining means includes means for determining and processing the test cell order determining information of the test cell.

26. The device according to claim 23, wherein said test cell generating means includes means for creating a test cell which contains test cell quality determining data in a pay-load area of ATM cell format in said ATM exchange; and said cell determining means includes means for determining and processing the test cell quality determining data of the test cell.

27. The device according to claim 26, wherein said test cell quality determining data is a random pattern standardized by ITU-T.

28. The device according to claim 23, wherein said test cell generating means includes means for creating a test cell which contains data for checking an error of pay-load data in a pay-load area of ATM cell format in said ATM exchange; and said cell determining means includes means for determining and processing the data of the test cell for checking an error of pay-load data.

29. A preset virtual path determining device for determining a preset virtual path in communication between subscribers the device comprising:

a test cell generating section for periodically generating a path determining test cell at preset timing on a user line side of an ATM exchange, time-divisionally multiplexing the same with a user cell and transmitting a result of multiplexing to an ATM exchange, said test cell generating section including a device for creating a test cell which contains information indicating the number of user cells sandwiched between test cells in a pay-load area of ATM cell format in said ATM exchange; and a cell determining section for determining whether a cell supplied from said ATM exchange is a user cell or test cell, and determining the path based on information of the test cell when the received cell is the test cell and outputting the user cell to the user line side when the received cell is the user cell, said cell determining section including a device for determining and processing the information of the test cell indicating the number of user cells sandwiched between the test cells.

30. The device according to claim 29, wherein said test cell generating section includes a indication portion setting section for setting a test cell indication data in a tag area of ATM cell format in said ATM exchange and creating a test cell; and said cell determining section includes a indication portion determining section for determining whether or not an ATM cell is a test cell based on the test cell indication data.

31. The device according to claim 29, wherein said test cell generating section includes a device for creating a test cell containing the information indicating the number of user cells sandwiched between test cells, test cell order determining information indicated a sequential number of the test cell, test cell quality determining data, and data for checking an error of pay-load data in a pay-load area of ATM cell format in said ATM exchange; and said cell determining section includes a device for determining and processing the information of the test cell indicating the number of user cells sandwiched between the test cells, the test cell order determining information, the test cell quality determining data, and the data for checking an error of pay-load data.

32. The device according to claim 31, wherein said test cell quality determining data is a random pattern standardized by ITU-T.

* * * * *